United States Patent
Haskin et al.

(10) Patent No.: US 9,127,942 B1
(45) Date of Patent: Sep. 8, 2015

(54) SURFACE DISTANCE DETERMINATION USING TIME-OF-FLIGHT OF LIGHT

(71) Applicants: Menashe Haskin, Palo Alto, CA (US); Christopher D. Coley, Morgan Hill, CA (US); Gregg Elliott Zehr, Palo Alto, CA (US); Ronald Joseph Degges, Jr., Los Gatos, CA (US)

(72) Inventors: Menashe Haskin, Palo Alto, CA (US); Christopher D. Coley, Morgan Hill, CA (US); Gregg Elliott Zehr, Palo Alto, CA (US); Ronald Joseph Degges, Jr., Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 13/624,611

(22) Filed: Sep. 21, 2012

(51) Int. Cl.
*G01C 3/08* (2006.01)

(52) U.S. Cl.
CPC ........................................ *G01C 3/08* (2013.01)

(58) Field of Classification Search
CPC ......... G01C 3/08; G01S 7/4811; G01S 17/89; G01S 7/4865
USPC ................................................ 356/3.01–28.5
See application file for complete search history.

(56) References Cited

U.S. PATENT DOCUMENTS

| 5,198,877 | A | * | 3/1993 | Schulz | 356/614 |
| 7,418,392 | B1 | | 8/2008 | Mozer et al. | |
| 7,720,683 | B1 | | 5/2010 | Vermeulen et al. | |
| 7,774,204 | B2 | | 8/2010 | Mozer et al. | |
| 2007/0146682 | A1 | * | 6/2007 | Tachino et al. | 356/4.01 |
| 2012/0223885 | A1 | | 9/2012 | Perez | |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Luke Ratcliffe
(74) *Attorney, Agent, or Firm* — Lee & Hayes, PLLC

(57) ABSTRACT

In some embodiments, a distance between the at least one light sensor and the surface may be calculated using a ratio representative of the phase difference using time-of-flight of light. The distance may be within a distance range defined by a distance of light travel during a modulation period of the predetermined frequency. The distance may be based on the ratio defined by an amount of energy stored from captured light during a first time interval and a second time interval, and a comparison of an amount of light stored from captured light during at least a third time interval. The first, second, and third time intervals are different, but may overlap in some instances. In some embodiments, the amount of ambient light may be identified and subtracted from the inputs of the ratio. A switch may be used to prevent oversaturation of a storage element storing the stored energy.

26 Claims, 13 Drawing Sheets

SURFACE DISTANCE DETERMINATION USING TIME-OF-FLIGHT OF LIGHT

BACKGROUND

A distance between objects can be measured by emitting light and measuring a time-of-flight of the light between the objects. Traditional measurement of light using time-of-flight uses light and calculates a distance based on the amount of time between the emission of the light and a time when the light is captured at a sensor. Typically, the sensor is located near a light emitter that emits the light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques to determine a distance associated with a surface using time-of-flight of a plurality of pulses of light occurring at a predetermined frequency. The pulses of light and corresponding intervals between the pulses of light may be substantially equal in length of time and be graphically represented by a square wave. However, other pulses patterns may be employed that do not include equal lengths of time (e.g., emit light for 0.25 µs every 1 µs, etc.) At least one light sensor may detect or capture light from the pulses of light being reflected off a surface. A phase difference in the captured pulses of light may be determined based on an amount of light captured at different time intervals during a cycle of the predetermined frequency. In accordance with various embodiments, a distance between the at least one light sensor and the surface may be calculated using a ratio representative of the phase difference. The distance may be within a distance range defined by a distance of light travel during a modulation period (cycle) of the predetermined frequency. The distance may be based at least in part on the ratio defined by an amount of light captured during a first time interval and a second time interval, and a comparison of an amount of the reflected light captured during at least a third time interval. The first, second, and third time intervals are different, but may overlap in some instances.

The calculated distance may be used to determine movement of a surface and/or one or more surface locations of a surface. In some instances, the calculated distance may be used to identify a profile of a surface, which may then be used to associate the profile with an object, a command, or another association.

The systems and techniques described herein may be implemented in a number of ways. Example implementations are provided below with reference to the following figures.

Figure 1:
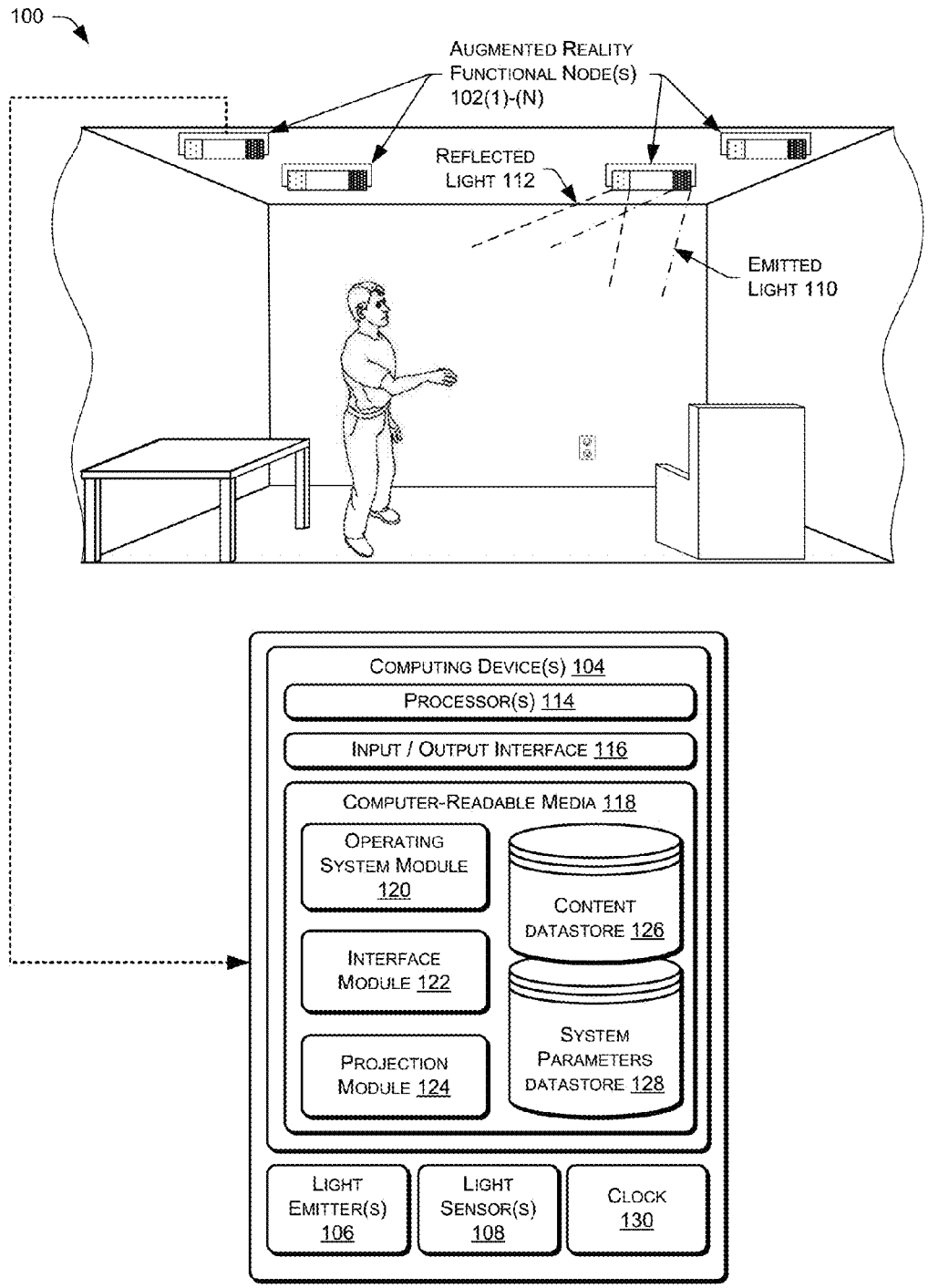
FIG. 1 illustrates an environment that includes an augmented reality functional node (ARFN) and a user that may interact with the ARFN.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more light emitters 106 that, when active, emit light onto any surface within the environment 100.

In some embodiments, the light emitter(s) 106 may include one or more projectors that project content onto any surface. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more light sensor(s) 108 that may capture light that is emitted from the light emitter(s) 106 and reflected off a surface.

In some embodiments, the light sensor(s) may be used to determine movement of surfaces, such as movement of user operating the UI. In response, the ARFN 102 may provide feedback to the user and/or may cause performance of actions corresponding to the user's operation of the UI. For instance, when the ARFN 102 projects a remote control, the ARFN 102 may provide feedback to the user indicating which button(s) a user is in position to select, may identify a user's selection (e.g., a selection to power on the television) and, in response, may operate the television according to an identified selection. While a few examples have been given, it is to be appreciated that the ARFN 102 may project any other sort of content within the environment 100. In addition, the ARFN 102 may recognize and interpret gestures that are made by the user without reference to a UI projected within the environment. In addition, the ARFN 102 may recognize and interpret gestures that are made by the user, and based on the gestures, generate a UI (e.g., a virtual UI) projected within the environment.

In this example, one of the ARFNs 102 within the environment is shown to provide emitted light 110 as pulses of light. In addition, the ARFN may capture reflected light 112 within the environment for the purpose of identifying distances between the ARFN and a surface that reflects the light.

While FIG. 1 illustrates one ARFN emitting the emitted light 110 and receiving the reflected light 112, in some implementations, one or more other ARFNs may additionally or alternatively perform one or both of these functions. In either instance, by scanning the environment in this manner, the ARFNs 102 may identify the location (e.g., distances) of objects within an environment and movement of the objects. In some instances, the objects may be people and the movements may be gestures performed by people within the environment. Such gestures may be interpreted as instructions or commands to be implemented by the ARFNs 102.

As illustrated, the computing device 104 of the example ARFN 102 includes one or more processors 114, an input/output interface 116, and computer-readable media 118. The processors 114 may be configured to execute instructions, which may be stored in the computer-readable media 118 or in other computer-readable media accessible to the processors 114.

Figure 2:
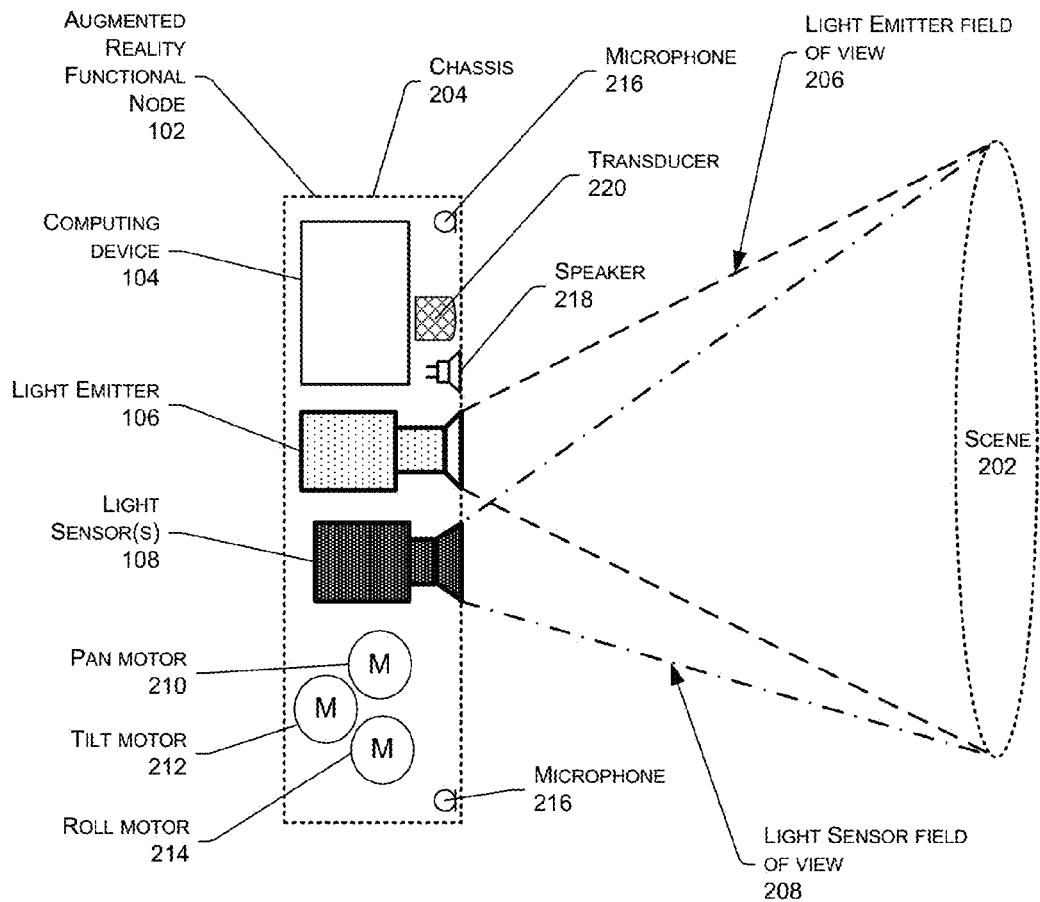
FIG. 2 illustrates an example ARFN that includes a computing device, a light emitter, light sensor(s), and other selected components for allowing a user to interact with the ARFN.

The input/output interface 116, meanwhile, may be configured to couple the computing device 104 to other components of the ARFN 102, such as the light emitter 106, the light sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the light emitter 106 or the light sensor 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse data captured by the light sensors 108 to identify hand gestures made by users within the environment 100. In response to identifying a predefined gesture, the interface module 122 may interpret the gesture and cause the ARFN 102 to perform a corresponding action.

For instance, if a user within the environment 100 makes a gesture requesting that the ARFN 102 project a certain piece of content, then the interface module 122 may interpret the gesture and cause the projection module 124 to project the content via the light emitter 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

The computer-readable media 118 may store the system parameters datastore 128, which is configured to maintain information about the state of the computing device 104, the light emitter 106, the light sensor 108, and so forth. For example, and as described in detail below, the ARFN 102 may be configured to pan and tilt for the purpose of allowing the light emitter 106 and the light sensor 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

In some embodiments, the computing device 104 may include a clock 130 to generate a clock cycle. The clock cycle may be used by the light emitters 106 and/or the light sensors 108 to control operation of the respective devices during time-of-flight of light measurements as discussed in greater detail below. In some instances, the clock 130 may be integrated with the processor(s) 114, one or more of the light emitter(s), 106, or another device.

FIG. 2 shows additional details of an example ARFN 102 that may be configured to measure distances of surfaces, identify movement of the surfaces (or objects), project a user interface (UI), and/or to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more light emitters 106 may be disposed within the chassis 204 and may be configured to generate and project light and/or images into the scene 202. The light may include visible light, non-visible light, or both. The images may be visible light images perceptible to the user, visible light images imperceptible to the user, images with non-visible light, or a combination thereof. The light emitter 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light emitter 106 may have a light emitter field of view 206 which describes a particular solid angle. The light emitter field of view 206 may vary according to changes in the configuration of the light emitter 106. For example, the light emitter field of view 206 may narrow upon application of an optical zoom to the light emitter 106. The light emitter field of view 206 may result in emission of light over a small surface area or a larger surface area.

One or more light sensors 108 may also be disposed within the chassis 204. The light sensors 108 are configured to receive light emitted by the light emitter 106 and reflected off a surface in the scene 202. Thus, the light sensors 108 receive reflected light. The light sensors 108 have a light sensor field of view 208 that describes a particular solid angle. The light sensor field of view 208 may vary according to changes in the configuration of the light sensor(s) 108. For example, an optical lens included with one of the light sensors may narrow the light sensor field of view 208. The light sensor field of view 206 may result in capture of light from a small surface area or a larger surface area, and may align with the light emitter field of view 206.

In some implementations, a plurality of light sensors 108 may be used where each light sensor includes a photodiode and a storage element. In some embodiments, a light sensor may be equipped a photodiode that is shared by a plurality of storage elements, which each store energy during intervals of time. The storage elements may be any electronic/semiconductor device structures that can store energy as a charge. Examples include, without limitation, capacitors and charge-coupled devices. These storage elements may be used to create data that indicates a distance of an object or surface in the scene 202, as explained in further detail below regarding discussion of time-of-flight of light.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the light emitter(s) 106 and/or the light sensor(s) 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. As mentioned above, microphones 216 and speakers 218 may be distributed throughout the scene. The light emitter 106 and the light sensor 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
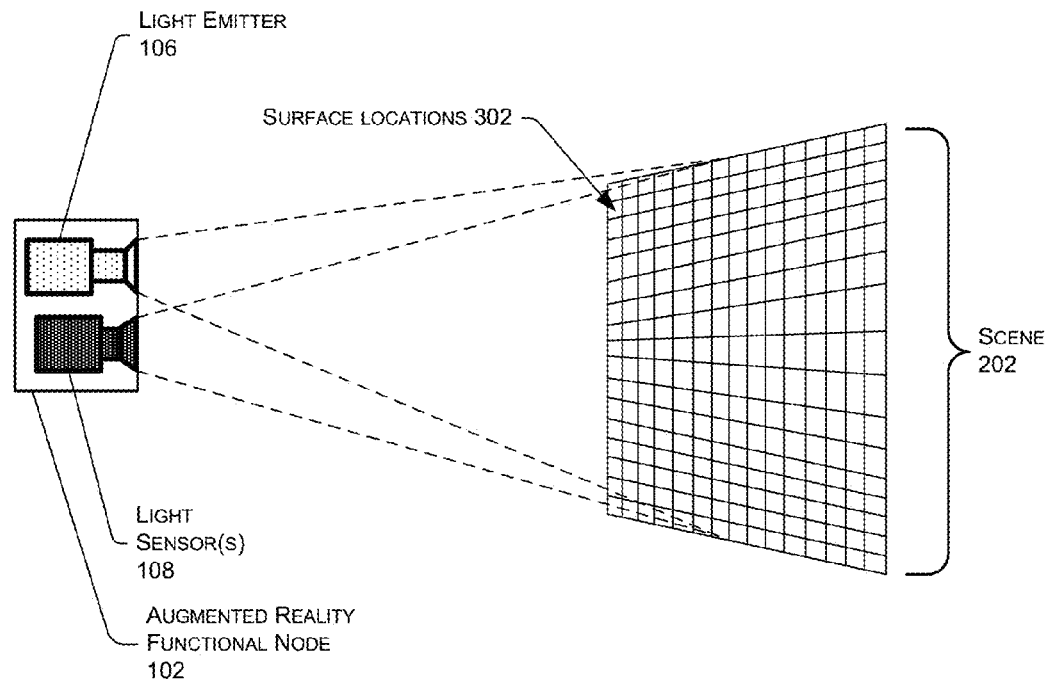
FIG. 3 is an illustrative diagram of the ARFN using a light emitter and time-of-flight (TOF) light sensors to identify surfaces, objects, and user interactions within an environment. By identifying user interactions, the ARFN is able to determine when a user is requesting that the ARFN perform a specified action.

FIG. 3 is an illustrative diagram of the ARFN 102 using time-of-flight (TOF) information to determine location and distance information regarding users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects.

In the instant illustration, the light emitter 106 emits pulses of light onto the scene 202. The pulses of light may be synchronized with a clock cycle from the clock 130 and include intervals of "on" and "off", which can be represented by a square wave. The pulses of light may be emitted in wavelengths that are visible to the user, non-visible to the user, or a combination thereof.

The light sensors 108 may be used to receive the emitted light after the light is reflected off objects or surfaces in the scene 202. The light sensors 108 may measure reflected light at specific surface locations 302 to determine a distance of objects or surfaces in the scene 202. For example, a pair of sensors may be used to measure the distance of a surface of a plurality of surface locations that reflect light. The surface locations 302 may be mapped over a wall, over objects (including people), or over any other surface included in an environment. The light sensors 108 may include elements to store measured light for each of the surface locations 302. Thus, the light sensors 108 may store a pixilated view of the surface locations, which may later be used to reproduce information about the scene 202.

The surface locations 302 may be represented as a grid for ease of illustration and not as a limitation. In other implementations other patterns, such as bars, dots, and so forth may be used. For example, the scene 202 may be analyzed as the plurality of surface locations 302 in a grid of [A×B] size, where the number of surface locations 302 is the product of A and B. For example, if the grid is [320×240], then the number of surface locations 302 is 76,800. Thus, in the example above, each of the 76,800 surface locations may be sensed by respective pairs of light sensors, thus 153,600 light sensors may be used in this example when two light sensors are used for each surface location. Other quantities of light sensors may also be used. The light sensors 108 may be formed on one or more silicon chips. For example, the light sensors 108 may be implemented as capacitors that store energy associated with an amount of light received from a respective surface location during a predetermined amount of time.

Figure 4:
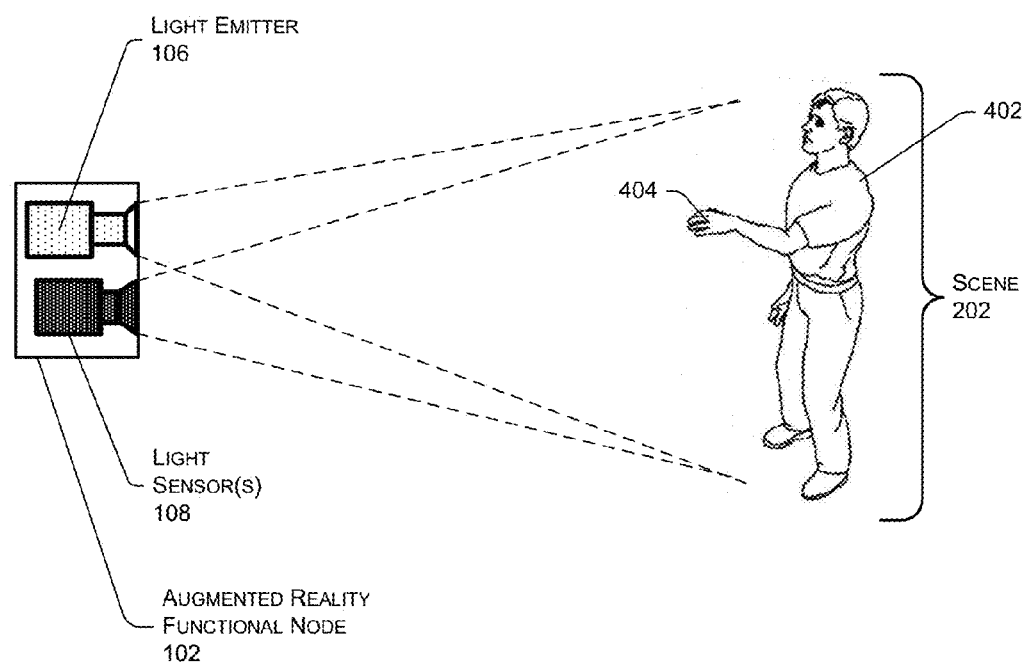
FIG. 4 is an illustrative diagram of the ARFN detecting the pose of a person within an environment.

FIG. 4 is an illustrative diagram of the ARFN 102 detecting the pose of a person within an environment. As discussed above, the light sensors 108 detect the light reflected from surfaces within the scene 202. The light sensors 108 may provide data that enables identification of a user 402 and/or other objects within the environment. In some instances, this information may be utilized to identify user gestures and trajectories of these gestures, such as a trajectory of a hand 404 of the user 402 or other body part of the user 402. The light sensors 108 may also provide data that can be used to identify a location of a selection tool (e.g., a user's finger) as this location changes over time. The ARFN 102 may then use these locations tracked over time to identify a trajectory of the gesture.

FIGS. 5A-5D illustrate techniques to perform TOF calculations by capturing light emitted by a light emitter and reflected off a surface. The captured light is used to determine a distance from the surface.

Figure 5A:
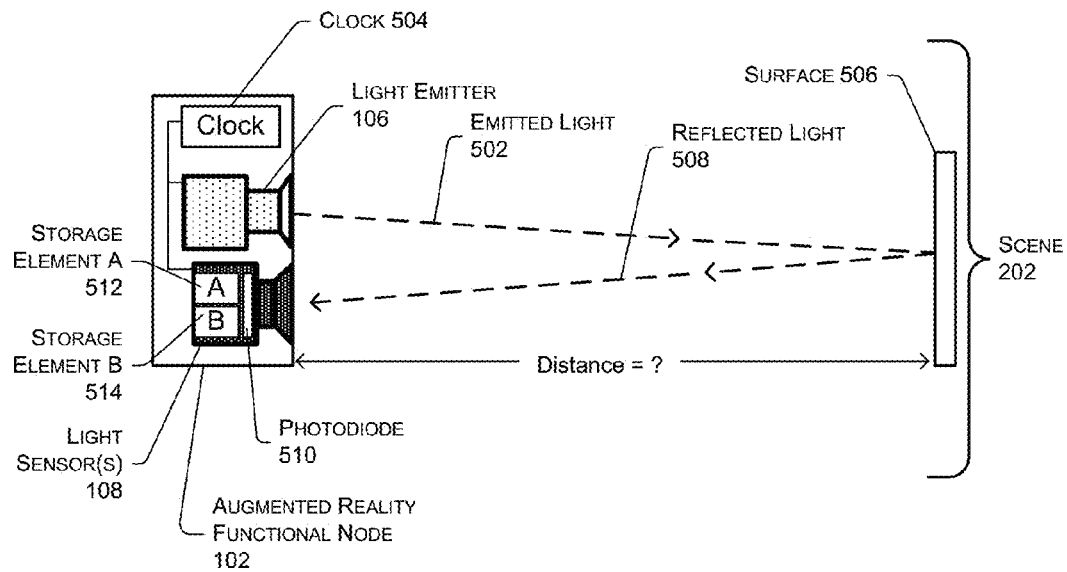
FIGS. 5A-5D illustrate basic techniques to perform TOF calculations by capturing light emitted by a light emitter and reflected off a surface. The captured light is used to determine a distance from the surface.

FIG. 5A shows the light emitter 106 that emits light (emitted light 502) projected in a direction toward the scene 202. The emitted light 502 is generated by pulsing light on and off by the light emitter 106 based on a clock cycle from a clock 504. The pulses of light may be represented by a square wave, which is shown and discussed with reference to FIG. 5B. However, other pulses patterns may be employed that do not include equal lengths of time (e.g., emit light for 0.25 µs every 1 µs, etc.) Meanwhile, the emitted light 502 may be reflected off a surface 506, such as off an object, a person, clothing, tools, and so forth. Reflected light 508 may travel back toward the light sensor(s) 108.

In accordance with one or more embodiments, the light sensor(s) 108 may include a photodiode 510, a storage element A 512 and a storage element B 514. In these embodiments, the photodiode 510 may be shared by multiple storage elements. However, some configurations may include a separate photodiode for each storage element. For the sake of the following discussion (and through this document), either configuration may be used. The storage elements A and B may store energy from the reflected light 508 captured by the photodiode at different intervals of time. For example, the storage element A 512 may cycle on at a first time and off at a second time while the storage element B 514 may cycle off at the first time and on at the second time in opposite alternation (inverse synchronization) with the storage element A 512. In some embodiments, additional storage element may be used in addition to the storage element A 512 and the storage element B 514, which may store energy from light at different intervals and/or overlapping intervals. The storage elements 512 and 514 may be capacitors or other hardware used to store energy converted from light. At some points, the discussion below may refer to a capture of light from different light sensors, however, it shall be understood that a light sensor with a shared photodiode can capture different time intervals of light using multiple storage elements, and thus may perform the function of multiple sensors.

Figure 5B:
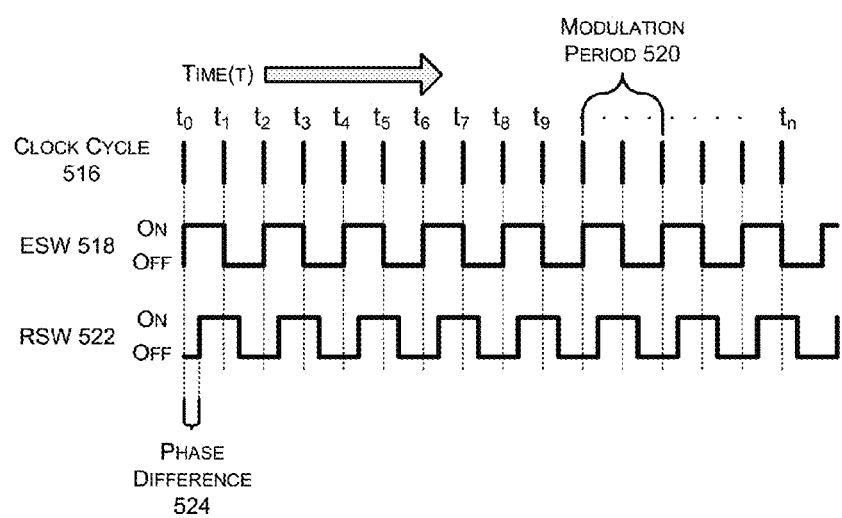

FIG. 5B shows a clock cycle 516 plotted with respect to time (t). The clock cycle 516 may be generated by the clock 504 and include equal segments of time based on a predetermined frequency. In addition, FIG. 5B shows an emitter square wave (ESW) 518 that represents a graph of the pulsing of light by the light emitter 106 between an on-state of operation and an off-state of operation. Although the various waves discussed herein are referred to as square waves, other types of waveforms may be employed to accomplish the same or similar results. In various embodiments, the on-state and the off-state may be equal in length of time and synchronized with the clock cycle 516. For example, the light emitter 106 may emit light for x clock cycles and then be off for x clock cycles until emitting light again for x clock cycles, and so forth. A modulation period 520 is defined by each complete cycle of the light emitter 106 operating the on-state and the off-state once. In the example above, the modulation period 520 is 2×.

FIG. 5B also shows a received square wave (RSW) 522 that represents a graph of the received pulses of the reflected light 508 as captured (stored, measured) by the light sensor 108. The RSW 522 shows when light is received (on) or not received (off), which is a function of the pulses of light generated by the light emitter 106. Unlike the ESW 518, the RSW 522 may not be synchronized with the clock cycle. A difference in the timing of the transitions of light (e.g., pulses) and the clock cycle is equal to a phase difference 524, which is shown in FIG. 5B, and dependent on a distance of travel of the reflected light 508. The phase difference may be used to determine a distance between the ARFN 102 and the surface 506. The use of the phase difference 524 is explained in further detail with reference to FIGS. 5C and 5D.

Figure 5C:
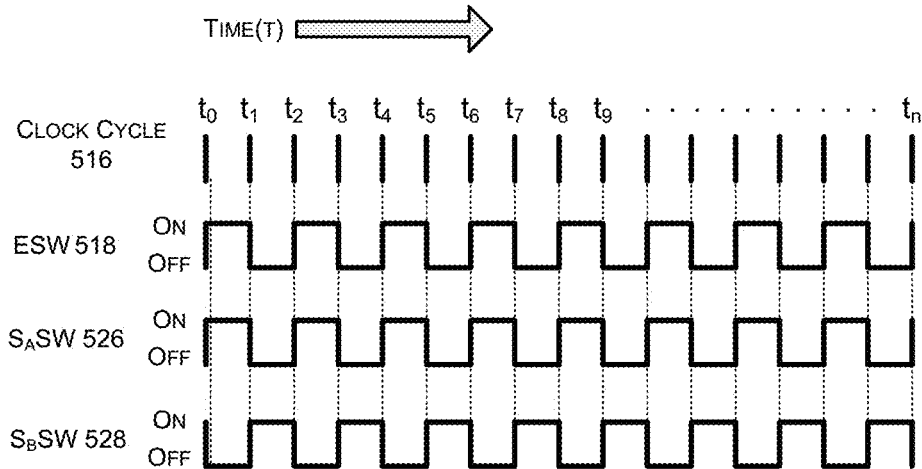

FIG. 5C shows the clock cycle 516, the ESW 518, and graphs depicting functionality of the light sensors 108 (i.e., the storage element A 512 and the storage element B 514) plotted with respect to time (t). In accordance with various embodiments, the storage element A 512 and the storage element B 514 may operate in synchronization with the clock cycle 516, and thus in synchronization with the ESW 518. In addition, the storage element A 512 may operate in opposite alternation (inverse synchronization) with the storage element B 514. Thus, when storage element A 512 is available to store energy from captured light, then storage element B 514 may be unavailable to store energy, and vice versa. A storage element A square wave ($S_A$SW) 526 shows an on-state and an off-state of the storage element A, where the storage element A and B are able to store energy when in the on-state and unable to store energy (e.g., off, blocked, disconnected, etc.) when in the off-state. The $S_A$SW 526 may be synchronized with the light emitter 106 (e.g., synchronized with the ESW 518, but not necessarily the same as the ESW). A storage element B square wave ($S_B$SW) 528 shows an on-state and an off-state of the storage element B, which is inversely synchronized with the $S_A$SW 526. The storage element A and B may be capacitors that receive a charge when light is captured by the photodiode 510 (i.e., the reflected light 508) during the on-state. The capacitors may be discharged after each modulation period or at other intervals (e.g., prior to oversaturation as discussed with reference to FIGS. 12 and 13). In various embodiments, additional storage elements may be employed in addition to the storage element A and B. In some embodiments, the storage element A and B may be implemented as separate sensors each having a photodiode that captures light in multiple time intervals (e.g., interval A and interval B), and so forth.

Figure 5D:
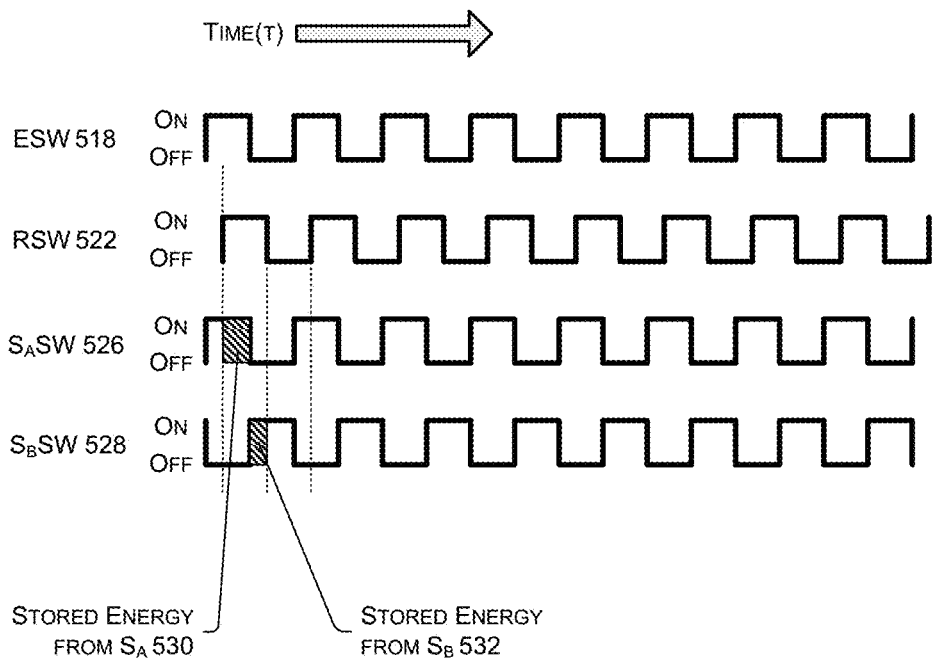

FIG. 5D shows the square waves discussed with reference to FIGS. 5B and 5C during an example plot of time-of-flight of pulses of light. When the $S_A$SW 526 is in the on-state and light is received by the light sensor(s) 108 (shown by the RSW 522), then the storage element A 512 may store energy from captured light such that an amount of light captured by the photodiode 510 can be measured during the on-state of the storage element A (e.g., by charging a capacitor, etc.). The amount of energy stored during this cycle of storage element A is shown as stored energy from storage element A ($SES_A$) 530. When the storage element A is in the off-state, the storage element A no longer stores energy, and thus the $SES_A$ 530 has achieved a maximum value during this modulation period. As discussed above, the storage element B 514 may transition to the on-state when the storage element A transitions to the off-state. When the $S_B$SW 528 is in the on-state and light is received by the light sensor(s) 108, then the storage element B 514 may store energy such that an amount of stored energy can be measured during the on-state of the storage element B (e.g., by charging a capacitor, etc.). The amount of energy stored during this cycle of storage element B is stored energy from storage element A ($SES_B$) 532. When the storage element B is in the off-state, the storage element B no longer stores energy, and thus the $SES_B$ 532 has achieved a maximum value during this modulation period.

Since light travels at a known velocity, a ratio of the $SES_A$ 530 and $SES_B$ 532 provides a linear plot, and thus allows calculation of a distance between the surface 506 and the ARFN 102 (or other known position) when the distance is within a predetermined range. The predetermined range is equivalent to the amount of time of the pulse of light (i.e., the on-state) from the light emitter 106 multiplied by the speed of light (approximately 300,000 km/s). For example, when the pulse is 0.5 µs, then the predetermined range is 150 meters. Thus, the ratio of the $SES_A$ 530 and $SES_B$ 532 enables determination of distances within a known 150 meter range in this example. Outside of this range, the ratio of $SES_A$ 530 and $SES_B$ 532 may correspond to different distances which have the same ratio value, such as distances of 75 meters and 225 meters in this example, both having ratios of 50:50 or one-half the predetermined distance. This creates an aliasing problem, which can be addressed in part by use of at least a third storage element or light sensor (i.e., to create another time interval) as discussed below with reference to FIGS. 7-9.

Figure 6:
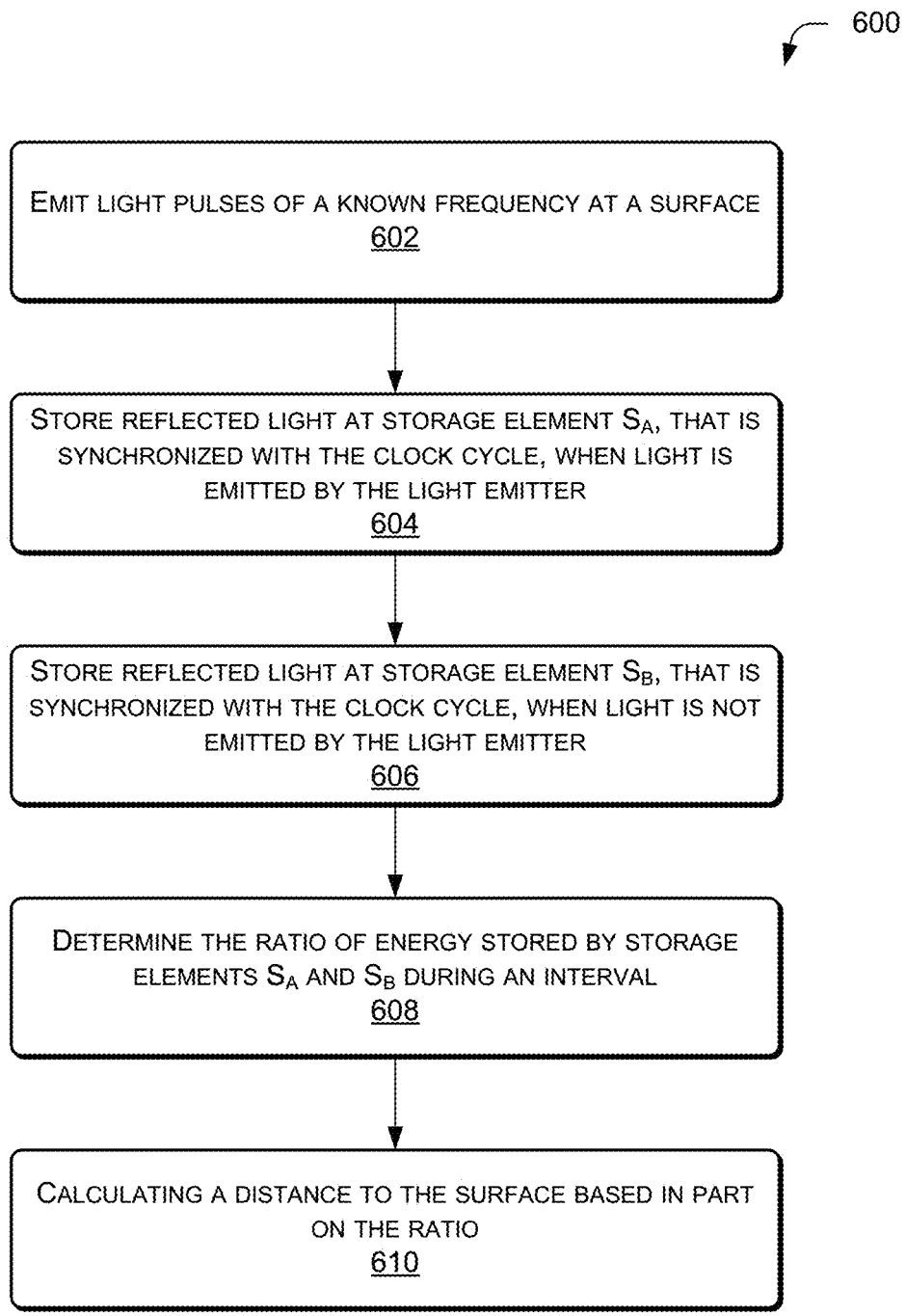
FIG. 6 illustrates a flow diagram of an illustrative process to calculate a distance using a ratio of light captured by various sensors or storage elements.

FIG. 6 illustrates an example flow diagram 600 of a process to calculate a distance using the ratio of light captured by various sensors or storage elements.

At 602, light pulses of a known frequency are emitted at a surface. The frequency may be synchronized with a clock cycle and may have equal lengths of time of emission of light and no emission of light (e.g., on/off). The light pulses may be represented by a square wave as shown in FIGS. 5B-5D; however, other waveforms may be used. The selection of the frequency determines the predetermined range of distances that can be determined using the ratio as discussed here. The selection of the frequency may also determine an accuracy of the measurements, and thus accuracy of the distance calculations. Distances outside of this range may have a same ratio when using two sensors or storage elements (e.g., $S_A$, $S_B$), and thus provide a duplication or aliasing effect.

At 604, reflected light is captured by the photodiode 510 and stored by the storage element A 512 when the storage element A is in the on-state and is able to store energy. The storage element A 512 may be synchronized with the clock cycle, and thus may store energy when the light emitter emits light in the on-state.

At 606, reflected light is captured by the photodiode 510 and stored by the storage element B 514 when the storage element B is in the on-state and is able to store energy. The storage element B 514 may operate in an opposite alternation with the storage element A, thus storage element B 514 may be operating in the on-state when the storage element A 512 is operating in the off-state. Therefore, the storage element B 514 may be inversely synchronized with the storage element A 512.

At 608, a ratio is determined for the amount of energy stored by the storage element A 512 ($SES_A$ 530) and the amount of energy stored by the storage element B 514 ($SES_B$ 532) during a modulation period or other interval of time.

At 610, a distance between the surface that reflects the light and the ARFN 102 is calculated based in part on the ratio, the predetermined frequency of the pulses of light, and the speed of light. As discussed above, the distance may need to be within a predetermined range to avoid a duplication or aliasing effect. The aliasing effect is described in greater detail with reference to FIG. 7.

Figure 7:
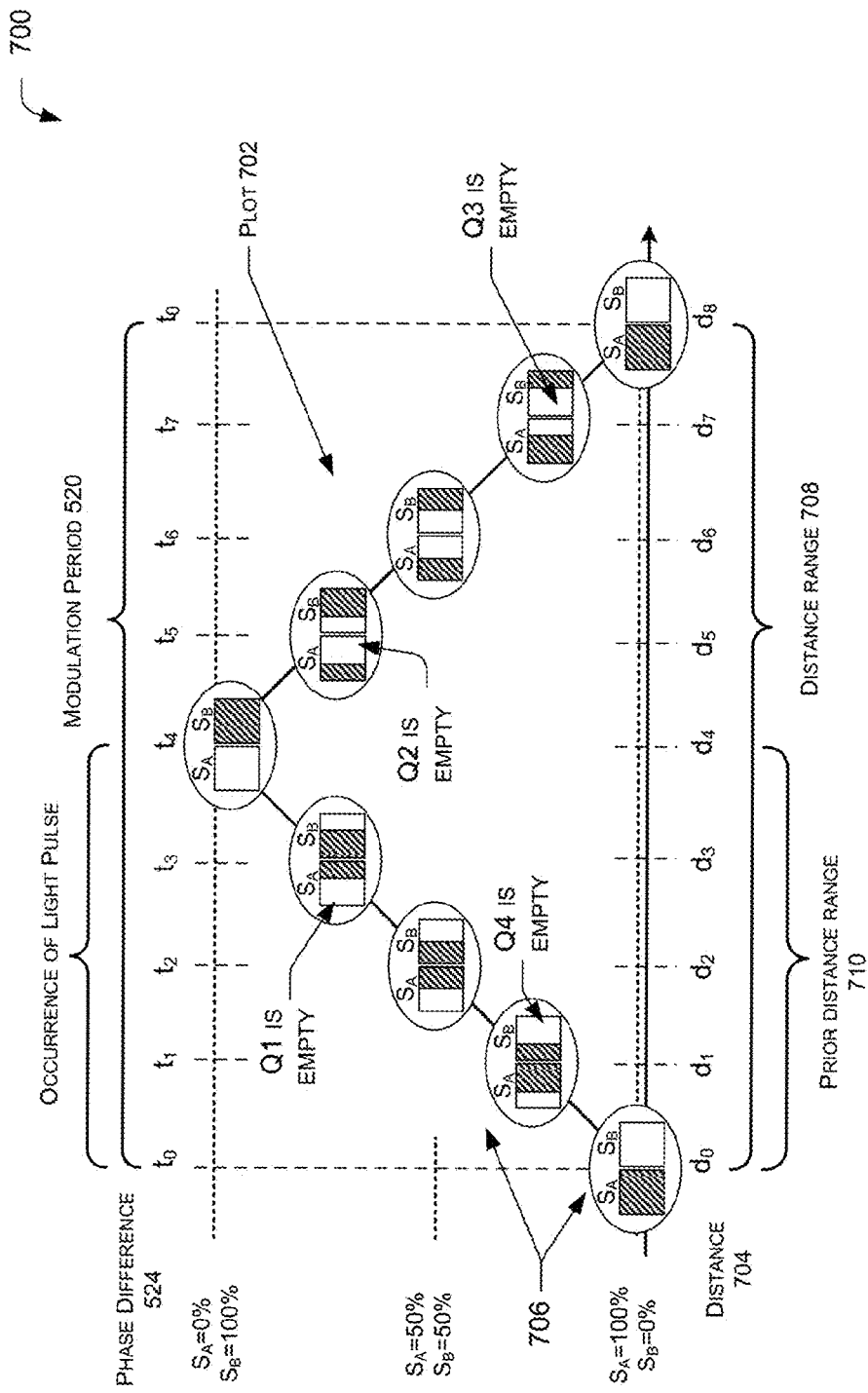
FIG. 7 illustrates a graph showing ratios of light captured by at least two sensors or time intervals.

FIG. 7 shows a graph 700 that includes a plot 702 depicting the ratio of the $SES_A$ 530 and the $SES_B$ 532 over a distance 704 equivalent to a distance light travels during a full modulation period (on and off pulse of the light emitter 106). The plot 702 assumes that the storage element A 512 is synchronized with the light emitter 106, and thus is in the on-state at the same time as light is emitted by the light emitter. The storage element B 514 is in the on-state when the light emitter 106 is not emitting light. The discussion of the plot 702 uses an example frequency of 1 MHz, which has a modulation period of 1 µs and pulses of light lasting 0.5 µs; however, other frequencies can be used that may be tailored to different distance ranges. Various points in the plot 702 are depicted by illustrative snapshots 706 of the storage elements $S_A$ and $S_B$ that show when energy is stored by the storage elements $S_A$ and $S_B$ over time by way of crosshatching.

At $d_0$, the phase difference 524 is $t_0$ (0 µs in this example), and thus all of the light (e.g., 100%) emitted from the light emitter 106 will be stored as energy by the storage element A 512 (which is on while the light is emitted) and no light (e.g., 0%) emitted by the light emitter will be stored as energy by storage element B 514 (which is off while the light is emitted).

At $d_1$, the phase difference 524 is $t_1$ (between 0 µs and 0.25 µs). Most of the light is stored as energy by the storage element A 512 while some light is stored as energy by the storage element B 514. As shown by the snapshot 706 at $d_1$, the storage element A 512 initially does not store energy until the light travels the distance $d_1$ in the amount of time $t_1$, thus the left side of the storage element $S_A$ is shown without crosshatching.

At $d_2$, the phase difference 524 is $t_2$ (0.25 µs in this example). About half of the light (e.g., 50%) emitted from the light emitter 106 will be stored as energy by the storage element A 512 (which is on during the first part of the pulse while the light is emitted) and about half of the light (e.g., 50%) emitted from the light emitter will be stored as energy by the storage element B 514 (which is on during the second part of the pulse while the light is emitted).

At $d_4$, the phase difference 524 is $t_4$ (0.5 µs in this example), and thus all of the light (e.g., 100%) emitted from the light emitter 106 will be stored as energy by the storage element B 514 (which is on when the light travels back to the sensor B) and no light (e.g., 0%) emitted by the light emitter will be stored as energy by storage element A 512 (which is off when the light travels back to the sensor A).

At $d_6$, the phase difference 524 is $t_6$ (0.75 µs in this example). About half of the light (e.g., 50%) emitted from the light emitter 106 will be stored as energy by the storage element B 514 (which is on during the first part of the pulse while the light is emitted) and about half of the light (e.g., 50%) emitted from the light emitter will be stored as energy by the storage element A 512 (which is on during the second part of the pulse while the light is emitted).

When only two storage elements are used to store energy, then the technique of using the ratio of $SES_A$ 530 and the $SES_B$ 532 will result in an alias distances in a distance range 708. For example, the ratios of energy stored at the distances $d_2$ and $d_6$ are both ratios of 50:50 or one-half. Each distance between $d_0$ and $d_4$ has another alias distance between $d_4$ and $d_8$ having the same ratio.

Careful analysis of the snapshots 706 along the plot 702 reveals that there are portions of time where each storage element $S_A$ and $S_B$ does not store energy. For example, between $d_0$ and $d_2$, the storage element B 514 does not store energy during the second half of its on-state. This second half of the on-state for storage element B 514 is designated as quarter-four (Q4), where the storage element A 512 stores energy during Q1 and Q2 while the storage element B 514 stores energy during Q3 and Q4. Between $d_2$ and $d_4$, the storage element A 512 does not store energy during the first half of its on-state, which is designated as Q1. Between $d_4$ and $d_6$, the storage element A 512 does not store energy during the second half of its on-state, which is designated as Q2. Between $d_6$ and $d_8$, the storage element B 514 does not store energy during the first half of its on-state, which is designated as Q3. Exploitation of these observations is described next.

In accordance with various embodiments, the use of additional storage element(s) used to store energy during a portion (e.g., Q1, Q2, Q3, Q4) of the intervals used by the storage element A 512 or the storage element B 514 may be used to distinguish between distances from $d_0$ to $d_4$ and distances from $d_4$ to $d_8$. For example, during a test when the ratios of $S_A$ and $S_B$ are at 50:50, the distances must be either $d_2$ or $d_6$. However, if a third storage element that stores light at Q1 is employed, and during this test the third storage element does not collect reflected light emitted from the light emitter 106, then the distance must be $d_6$. Thus, the use of additional storage elements may pinpoint the distances in the distance range 708.

At $d_8$, the phase difference 524 is shifted back to $t_0$ (at 1 µs in this example), which is the start of a new modulation period and results in the same amount of energy stored as described above for the location $d_0$, assuming the surface, the light sensor 108, and the light emitter 106 remain in the same location. The technique of using the ratio of $SES_A$ 530 and the $SES_B$ 532 will result in an alias distance at $d_8$, which is indistinguishable from the distance at $d_0$, even with the use of an additional storage element.

Figure 8:
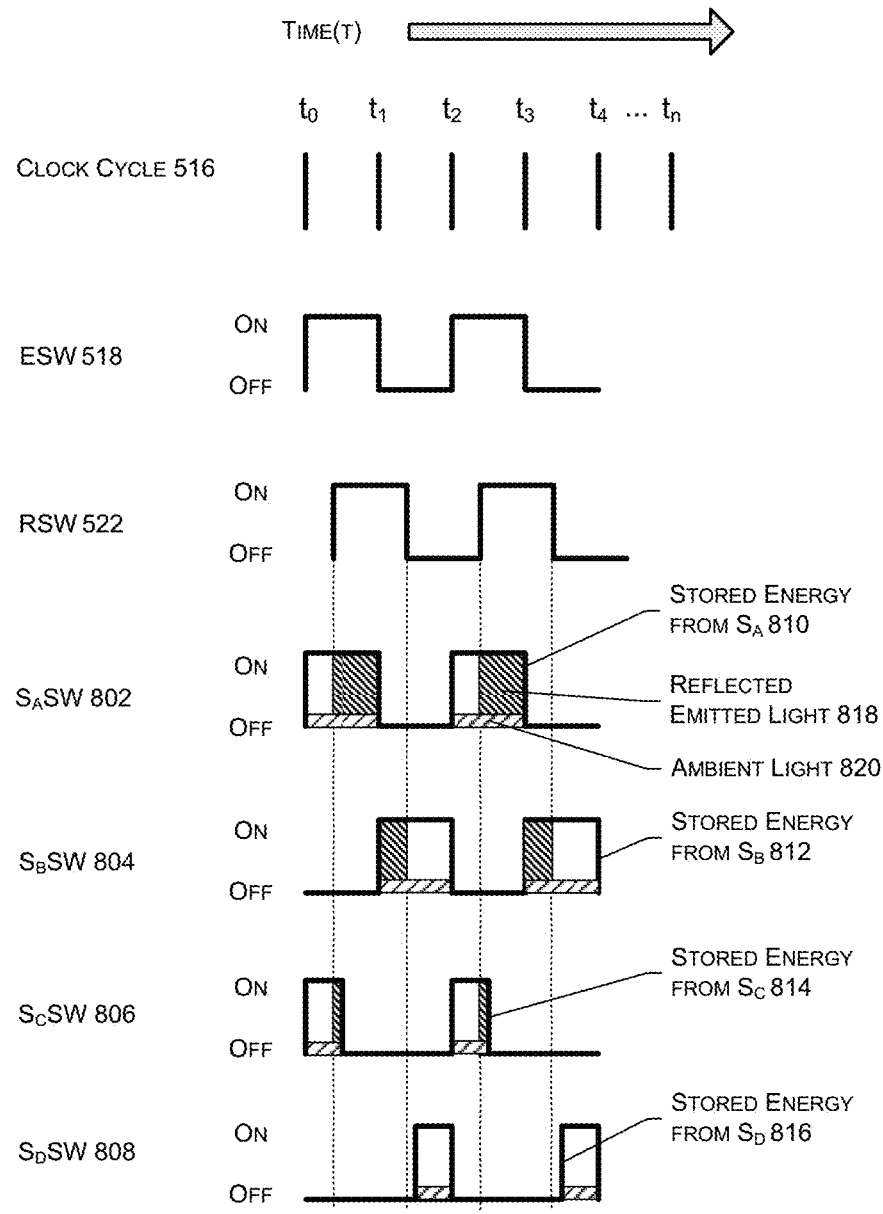
FIG. 8 illustrates techniques to calculate a distance of light travel using amounts of stored energy from light captured during at least three time intervals.
Figure 9:
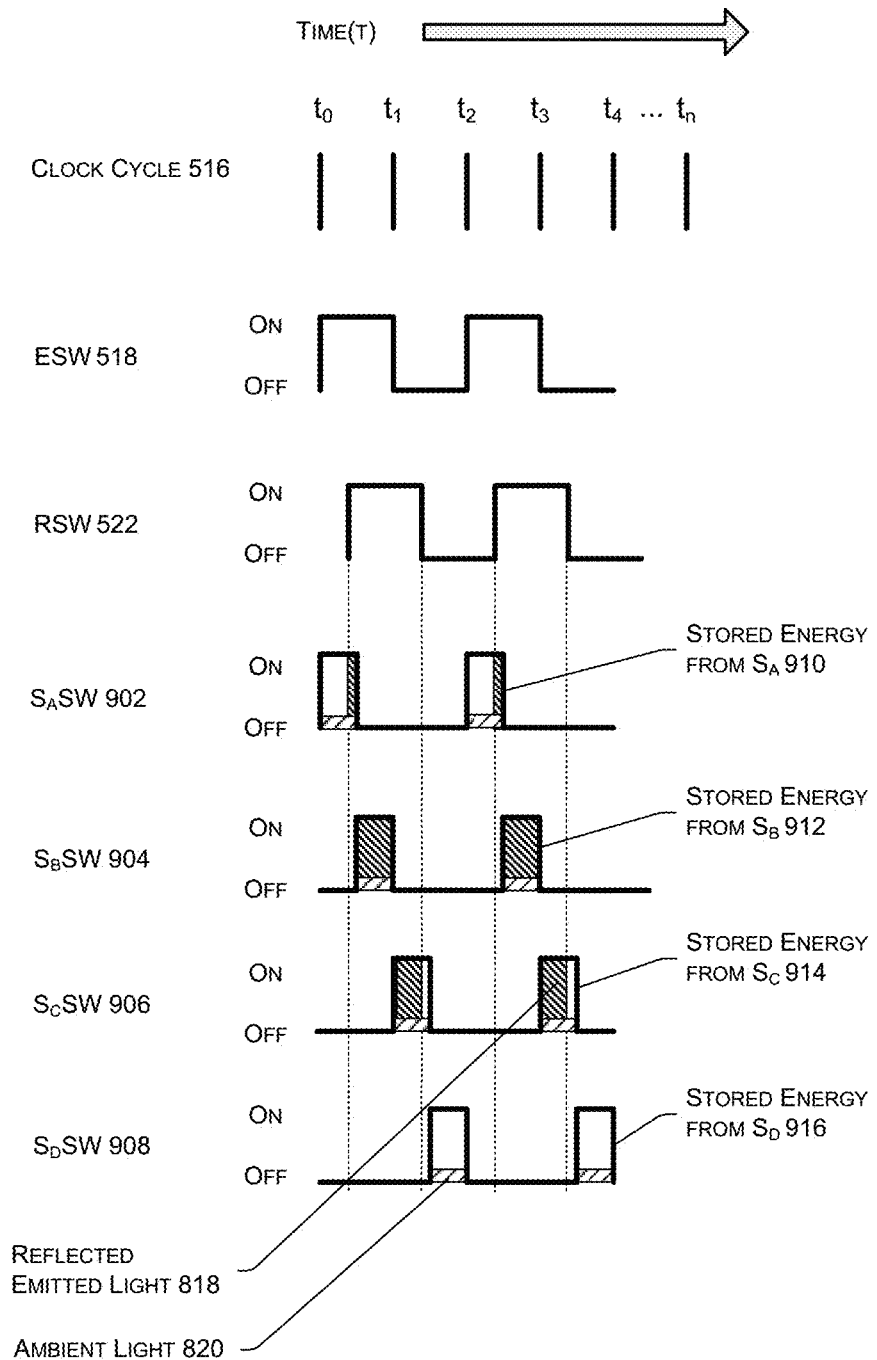
FIG. 9 illustrates additional techniques to calculate a distance of light travel using amounts of stored energy from light captured during at least three time intervals.

In accordance with some embodiments, the use of the additional storage elements may enable achieving the distance range 708, which may then be defined as a distance of light travel during a cycle of the predetermined frequency. In the above example where the predetermined frequency is 1 MHz and pulses of light are 0.5 µs, then the distance range is 300 m rather than the 150 m prior distance range 710, which would exist without the use of the additional storage elements (due to an aliasing effect which makes $d_2$ and $d_6$, for example, indistinguishable when comparing their respective ratios). FIGS. 8 and 9 describe use of additional storage elements that enable realization of the distance range 708.

FIG. 8 illustrates techniques to calculate a distance of light travel using amounts of stored energy from light captured during at least three time intervals. Similar to FIGS. 5C and 5D, FIG. 8 shows the clock cycle 516, the ESW 518, and the RSW 522. Following a similar arrangement, a storage element A may include a storage element A square wave $S_A$SW 802 which may have a same square wave as the ESW 518 (thus, the storage element A is on when the light pulse is emitted by the light sensor 108). A storage element B may include a storage element B square wave $S_B$SW 804 which has an inverse square wave as the ESW 518 (thus, the storage element B is off when the light pulse is emitted by the light sensor 108).

In accordance with some embodiments, a storage element C may include a storage element C square wave $S_C$SW 806 which has a square wave that shows the storage element C captures light during a first half of the interval used by the storage element A (e.g., Q1), thus capturing light during a quarter of the modulation period (or other interval of time). A storage element D may include a storage element D square wave SSW 808 which has a square wave that shows the storage element D captures light during a second half of the interval used by the storage element B (e.g., Q4), thus capturing light during a quarter of the modulation period (or other interval of time). In some embodiments, the storage element C may store energy during Q2 and/or the storage element D may store energy during Q3.

Using the example RSW 522 having the phase difference 524 as shown and described in FIG. 5B, the amount of energy stored from light captured while storage element A is in the on-state is depicted as stored energy from storage element A ($SES_A$) 810. The amount of energy stored from light captured while storage element B is in the on-state is depicted as stored energy from storage element B ($SES_B$) 812. The amount of energy stored from light captured while storage element C is in the on-state is depicted as stored energy from storage element C ($SES_C$) 814. The amount of energy stored from light captured while storage element D is in the on-state is depicted as stored energy from storage element D ($SES_A$) 816. The stored energy may be from reflected emitted light 818, which is light generated by the light emitter 106 and/or from ambient light 820, each shown with different crosshatching in FIG. 8. Thus, the $SES_A$ 810 includes both the reflected emitted light 818 and the ambient light 820. As shown in the snapshot, the ambient light 820 may be stored by the storage element during the entire time the storage element is in the on-state while the reflected light may or may not be stored as energy by the storage element depending on the phase difference 524.

The ratio used to determine the distance of a surface reflecting the light is $SES_A:SES_B$. An analysis of light captured by either $SES_C$ or $SES_D$ indicates whether the distance to the surface is in the first half of the distance range 708 (e.g., between distances $d_0$ and $d_4$ shown in FIG. 7) or in the second half of the distance range (e.g., between the distances $d_4$ and $d_8$ shown in FIG. 7). In some embodiments, the ambient light 820 may be subtracted out of the stored energy values from each storage element, such as by measuring the ambient light without use of the light emitter 106. This may enable isolating the reflected emitted light 818 and determining when a storage element is "empty", and thus includes no reflected emitted light. As shown in FIG. 8, the storage element D does not store energy from the reflected emitted light 820 when the received light has the example RSW 522, thus Q4 is empty (referring back to FIG. 7). Thus, since the example RSW 522 results the $SES_D$ 816 being "empty" because no reflected light is received by the storage element D, then the distance must be within a subset range of distances between $d_0$ and $d_2$ shown in FIG. 7. In some instances, both $SES_C$ 814 and $SES_D$ 816 may include stored energy from the reflected emitted light 818. In these instances, the stored energy indicates that the distance must be within a subset range of distances between $d_4$ and $d_8$ as shown in the FIG. 7.

FIG. 9 illustrates additional techniques to calculate a distance of light travel using amounts of energy stored from light captured during at least three time intervals. As shown in FIG. 9, the storage elements (or intervals) are of length 1/n, where n is the number of storage elements (or intervals) during the modulation period 520. The value of n is any integer greater than two. In the example shown in FIG. 9, n is equal to four.

In accordance with various embodiments, a storage element A may include a storage element A square wave $S_ASW$ 902 which has a square wave of a first discrete time interval of 1/n (¼ in this example) that partially overlaps with the ESW 518 (thus, the storage element A stores energy during the first half of the light pulse being emitted by the light emitter 106).

A storage element B may include a storage element B square wave $S_BSW$ 904 which has a square wave of a second discrete time interval of 1/n that partially overlaps with the ESW 518 (thus, the storage element B stores energy during the second half of the light pulse being emitted by the light emitter 106).

A storage element C may include a storage element C square wave $S_CSW$ 906 which has a square wave of a third discrete time interval of 1/n that partially inversely overlaps with the ESW 518 (thus, the storage element C stores energy during the first half of the interval between light pulses emitted by the light emitter 106).

A storage element D may include a storage element D square wave SSW 908 which has a square wave of a fourth discrete time interval of 1/n that partially inversely overlaps with the ESW 518 (thus, the storage element D stores energy during the second half of the interval between light pulses emitted by the light emitter 106).

Using the example RSW 522 having the phase difference 524 as shown and described in FIGS. 5B and 8, the amount of stored energy from light captured while storage element A is in the on-state is depicted as stored energy from storage element A ($SES_A$) 910. The amount of stored energy from light captured while storage element B is in the on-state is depicted as stored energy from storage element B ($SES_B$) 912. The amount of stored energy from light captured while storage element C is in the on-state is depicted as stored energy from storage element C ($SES_C$) 914. The amount of stored energy from light captured while storage element D is in the on-state is depicted as stored energy from storage element D (SES) 916. Each of the storage elements include the ambient light 818, and some, but not all, of the sensors include the reflected emitted light 818.

As shown in FIG. 9, the storage element D does not capture the reflected emitted light 818 when the received light has the example RSW 522 having the phase difference 524. In this example, the ratio used to determine the distance of the surface is $(SES_A+SES_B):(SES_C+SES_D)$. An analysis of a storage element (or interval) storing the least amount of energy (e.g., in an "empty" state having no energy from the reflected emitted light 818) indicates a subset range of possible distances of the surface. For example, when the $SES_D$ contains no energy stored from the reflected emitted light 818, then Q4 is "empty" and the distance of the surface must be in a subset range of distances between $d_0$ and $d_2$ as shown in FIG. 7.

Figure 10:
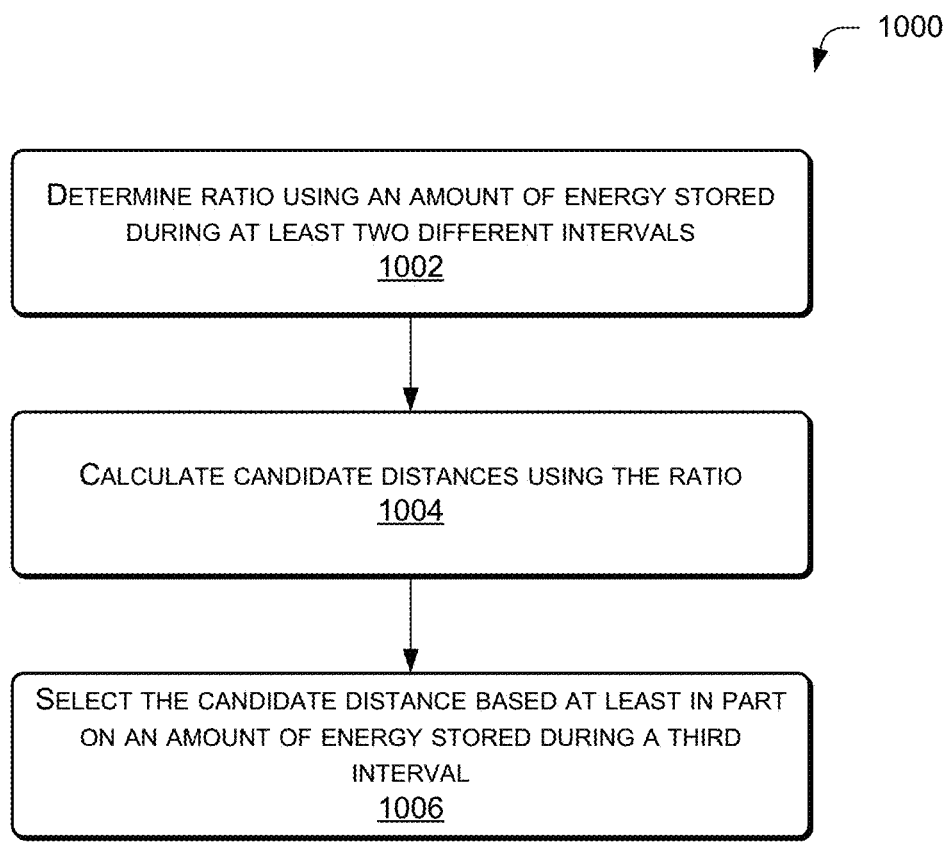
FIG. 10 is a flow diagram of an illustrative process to calculate a distance of a surface using TOF of light including captured light from at least three different time intervals.
Figure 11:
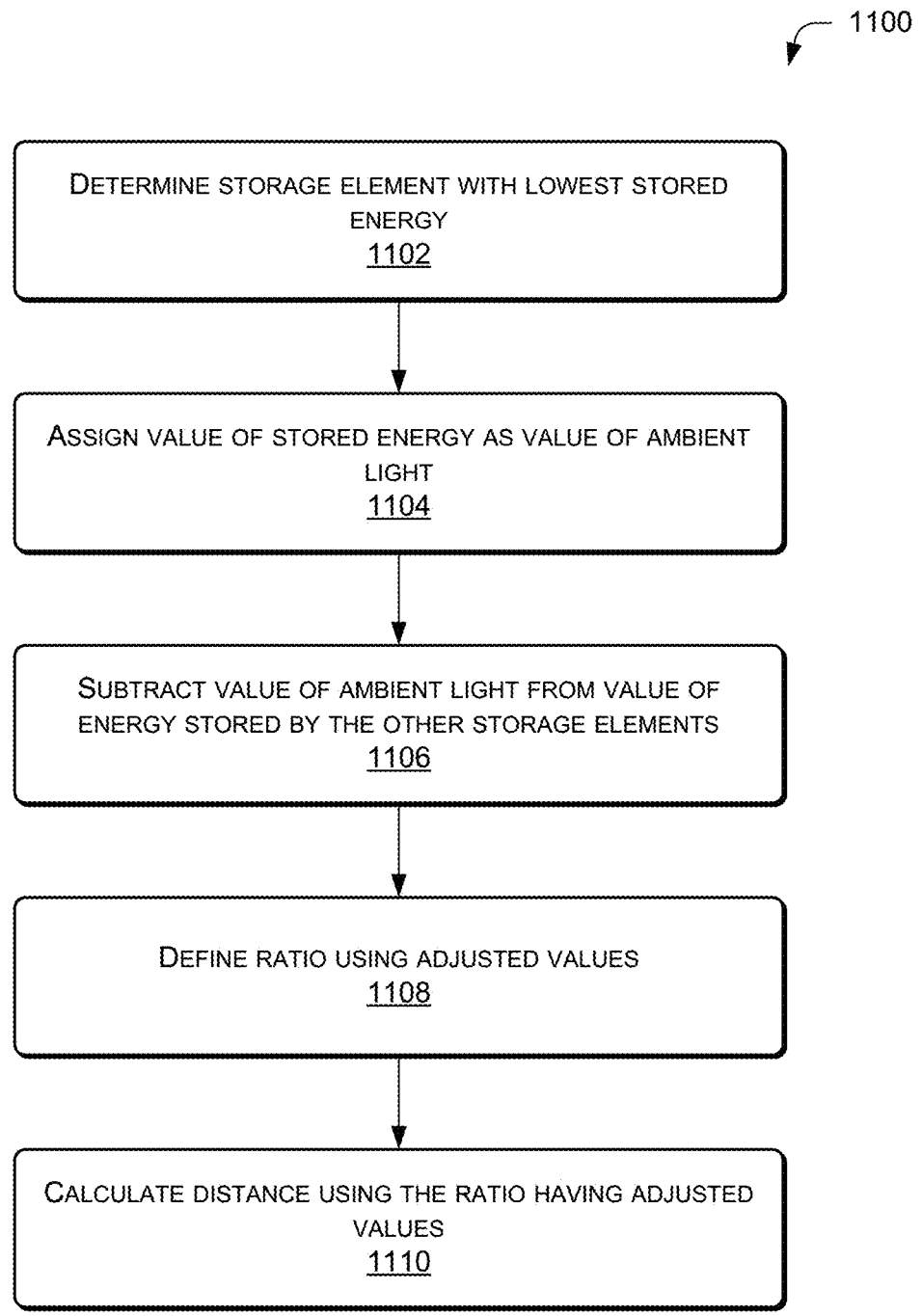
FIG. 11 is a flow diagram of an illustrative process to determine an amount of ambient light in an environment and to calculate a distance based at least in part on the amount of ambient light.

FIGS. 10 and 11 are flow diagrams of illustrative processes for determining distances using TOF of light. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 10 is a flow diagram of an illustrative process 1000 to calculate a distance of a surface using TOF of light including captured light from at least three different time intervals.

At 1002, the processor(s) 114 may determine a ratio using an amount of energy stored from light captured from the storage elements (or intervals) during at least two different intervals. For example, with reference to FIG. 8, the ratio may be determined as $[SES_A:SES_B]$ while with reference to FIG. 9, the ratio may be determined as $[(SES_A+SES_B):(SES_C+SES_D)]$.

At 1004, the processor(s) 114 may calculate candidate distances using the ratio. The candidate distances may be distances within the distance range (e.g., the distance range 708). The calculation may be performed using the speed of light, the predetermined frequency, and the ratio.

At 1006, the processor(s) 114 may select the candidate distance based at least in part on an amount of energy stored from light captured during a third interval (as shown and described with reference to FIG. 8). Similarly, as discussed with reference to FIG. 9, a storage element that stores a least amount of energy from captured light may be used to select the correct distance between a true distance and an alias distance.

FIG. 11 is a flow diagram of an illustrative process 1100 to determine an amount of ambient light in an environment and to calculate a distance based at least in part on the amount of ambient light. The ambient light having the same light frequency as the emitted light from the light emitter 106 may create some error in the distance calculation when using the ratios as discussed herein. Therefore, it may be advantageous to measure the ambient light and then subtract the ambient light from the stored energy (thus determining the value of the reflected emitted light 818) prior to generating the ratio.

The amount of ambient light may be determined by various techniques. One technique is to measure light using the light sensor(s) 108 prior to the emitting of light by the light emitter 106. Another technique is to determine a lowest amount of stored energy by a storage element configured as discussed with reference to FIG. 9, which may be implemented even when the light emitter 106 is emitting the pulses of light. In the example in FIG. 9, the storage element D has the lowest amount of stored energy, which is therefore representative of the amount of the ambient light. The process 1100 describes the latter technique; however both techniques can be used to determine the amount of the ambient light 820.

At 1102, the processor(s) 114 may determine a storage element with a lowest amount of stored energy from captured light.

At 1104, the processor(s) 114 may assign the value of the stored energy of the storage element (determined at the operation 1102) as a value of the ambient light 820.

At 1106, the processor(s) 114 may subtract the value of the ambient light 820 from the values of the other storage elements to determine adjusted values for the storage elements.

At 1108, the processor(s) 114 may define a ratio using the adjusted values from the operation 1106.

At 1110, the processor(s) 114 may calculate the distance using the ratio having the adjusted values that do not include the ambient light 820.

Figure 12:
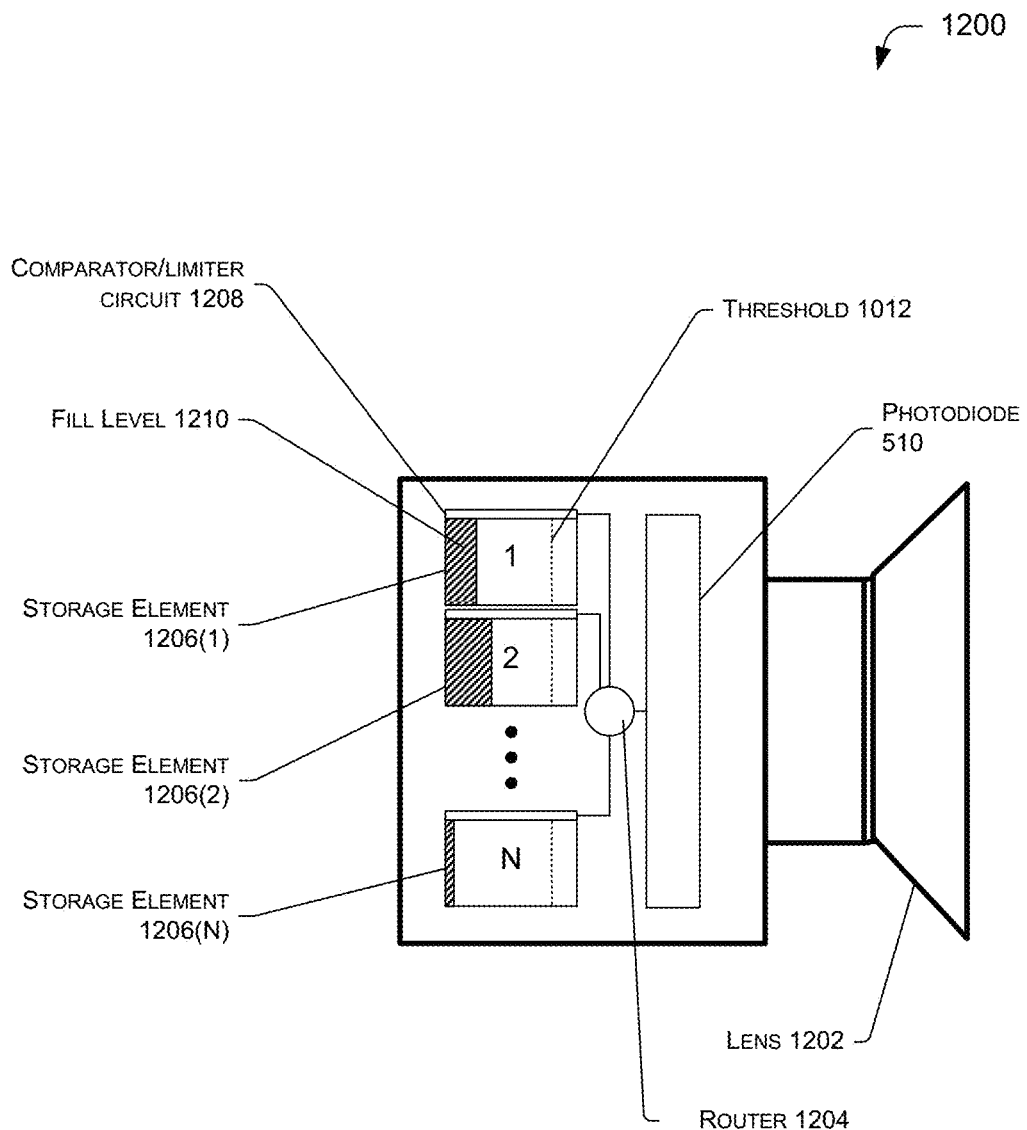
FIG. 12 is a schematic diagram of a sensor module that includes a comparator/limiter circuit that terminates storage of energy from a photodiode.

FIG. 12 is a schematic diagram of a sensor module 1200 that includes a comparator/limiter circuit that terminates storage of energy from a photodiode to prevent over saturation of light stored by a storage element.

The sensor module 1200 may include a lens 1202 that determines a field-of-view (FoV) of the scene 202. For example, a wide angled lens may be used to capture more light and thus have a larger FoV than a standard angle lens.

After the light enters the lens 1202, the light may be received by the photodiode 510 that converts the light into energy. The photodiode 510 photodiode 510 may be in communication with a router 1204 that selectively routes the energy from the photodiode into one of a plurality of storage elements 1206. The router 1204 may switch between the storage elements 1206(1), ... 1206(n) after each interval, such as intervals of 1/n length in time as discussed with reference to FIG. 9. The router 1204 may enable storage of energy from light in only one storage element at a time.

In accordance with various embodiments, each storage element may include a comparator/limiter circuit (CLC) 1208 which may compare an amount of energy stored in the respective storage element with a threshold 1012. In response to the amount of energy stored in the storage element reaching or exceeding the threshold 1012, the CLC 1208 may terminate further storage of energy in another cycle. In some embodiments, the CLC 1208 may activate a switch to at least temporarily disconnect the storage elements from the photodiode to prevent oversaturation of any of the storage elements. The CLC 1208 may cause or initiate calculation of the ratio (as described in the operation 1002, for example), and calculation of the distance (as described in the operation 1002, for example), which may use multiple cycles (multiple modulation periods) to store the energy used in the calculation of the ratio. The storage elements may then be discharged (emptied) before starting the process over.

The use of the CLC 1208 may prevent over saturation of the storage element, which may result in an overfilling of the storage element and may result in an inaccurate measurement of the ratio (e.g., via energy loss, etc.). The CLC 1208 may be configured as a limiter circuit, a comparator circuit, and/or any other type of switch which terminates the storage of energy sometime after the amount of energy reaches or exceeds the threshold 1212. The operation of the sensor module 1200 and CLC 1208 is described in greater detail with reference to FIG. 13.

Figure 13:
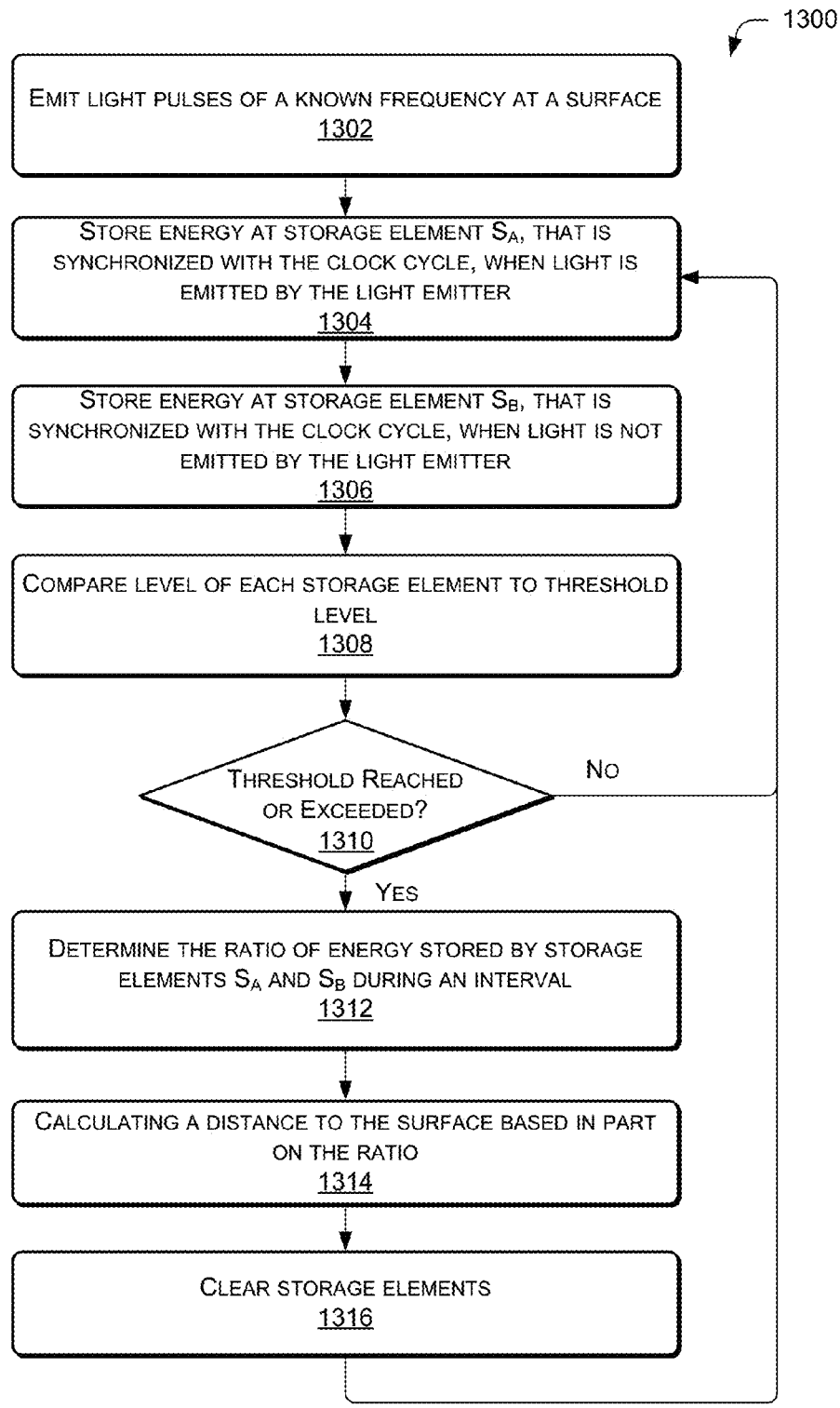
FIG. 13 is a flow diagram of an illustrative process to calculate a distance using a ratio of captured light collected prior to or shortly after activation of a comparator/limiter circuit.

FIG. 13 is a flow diagram of an illustrative process 1300 to calculate a distance using a ratio of captured light collected prior to or shortly after activation of a comparator/limiter circuit. While the process 1300 is described with reference to two storage elements $S_A$ and $S_B$, any number of storage elements may be arranged in any configuration described herein (e.g., the configuration shown in FIG. 8, the configuration shown in FIG. 9, etc.) and may be used to implement the process 1300.

Operations 1302, 1304, and 1306 may be performed in a similar manner as the operations 602, 604, and 606 with reference to FIG. 6.

At 1308, the CLC 1208 may compare the amount of stored energy in a storage element with the threshold 1212. At 1310, a determination may be made as to whether the amount of stored energy in the storage element reached or exceeded the threshold 1212. When the amount of stored energy in the storage element has not reached or exceeded the threshold 1212 (following the "no" route), then the process 1300 may continue at the operation 1304. However, when the amount of stored energy in the storage element has reached or exceeded the threshold 1212 (following the "yes" route), then the process 1300 may continue at an operation 1312.

At 1312, the processors may determine the ratio of energy stored by the stored elements during the interval up to, and possibly shortly after (e.g., following completion of the current modulation period, etc.), activation of the CLC 1208, but prior to the oversaturation (overfilling) of any one of the storage elements. At 1314, the processors may calculate a distance to the surface based in part on the ratio. At 1316, the storage elements may be discharged. The process 1300 may continue at the operation 1304 to obtain another distance measurement.

The CLC 1208 may be implemented for each of the light sensors. As discussed above, many light sensors may be used to detect distances of different surface locations (e.g., the surface locations 302). The CLC 1208 may operate independently for each light sensor (e.g., group of storage elements) associated with one of the surface locations. Thus, activation by the CLC 1208 may not terminate storage of energy by all storage elements, but may only terminate storage of energy by storage elements associated with a particular CLC 1208 and a particular surface location.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
   a light emitter to emit light in pulses having a predetermined frequency;
   at least one light sensor to capture, using a plurality of storage elements, energy from the light that is emitted from the light emitter and reflected off of a surface over a period of time including at least four time intervals, the plurality of storage elements including:

a first storage element to store energy from light captured during a first time interval that occurs for a length of time substantially equal to a duration of one of the pulses of light, a second storage element to store energy from light captured during a second time interval that occurs for a length of time substantially equal to an amount of time between each of the pulses, a third storage element to store energy from light captured during a third time interval that occurs during a portion of the first time interval, and a fourth storage element to store energy from light captured during a fourth time interval that occurs during a portion of the second time interval; and one or more processors to calculate a distance between the at least one light sensor and the surface, the distance being within a distance range defined by a distance traveled by the light during a cycle of the predetermined frequency, the one or more processors calculating the distance based at least in part on:

a ratio of a measurement of the light stored during the first time interval and a measurement of the light stored during the second time interval, and a comparison of a measurement of the light stored during the third time interval and a measurement of the light stored during the fourth time interval.

2. The system of claim 1, wherein the at least one light sensor comprises a photodiode, and wherein the plurality of storage elements receive energy from the photodiode.

3. The system of claim 2, further comprising a switch to at least temporarily disconnect the plurality of storage elements from the photodiode to prevent oversaturation of any of the plurality of storage elements, wherein activation of the switch initiates a process comprising determining the ratio by the one or more processors.

4. The system of claim 1, wherein the one or more processors further operate to determine a measurement of ambient light as a measurement of light captured during a time period when the light emitter is not emitting light.

5. The system of claim 4, further comprising adjusting the ratio by subtracting the measurement of the ambient light from the measurement of light captured during the first time interval and the measurement of light captured during the second time interval.

6. The system of claim 1, further comprising using the distance to track, within the distance range, movement of the surface.

7. A method comprising:

emitting, by at least one light emitter, light in pulses having a predetermined frequency;

detecting, by at least one light sensor, the light after the light is reflected off a surface, the detecting being performed during at least three time intervals including:

a first time interval that occurs for a length of time substantially equal to a duration of one of the pulses of light, a second time interval that occurs for a length of time substantially equal to an amount of time between each of the pulses, and a third time interval defined as occurring during a portion of the first time interval or during a portion of the second time interval, and calculating, by at least one processor, a distance associated with the surface, the distance being within a distance range defined by a distance traveled by light during a cycle of the predetermined frequency, the distance calculated based at least in part on:

a ratio of a measurement of the light detected during the first time interval and a measurement of the light detected during the second time interval, and a comparison of a measurement of the light detected during the third time interval and a measurement of ambient light.

8. The method of claim 7, wherein the detecting the light is performed by at least three light sensors.

9. The method of claim 7, wherein the detecting the light is performed by at least three capacitors that store energy from a photodiode connected to the at least three capacitors, each of the at least three capacitors storing energy during a different time interval.

10. The method of claim 7, further comprising determining the measurement of the ambient light by detecting light prior to the emitting the light in the pulses.

11. The method of claim 10, further comprising determining that the distance is within a predetermined subset of the distance range based at least in part on the measurement of the light detected during the third interval.

12. The method of claim 7, wherein the duration of each of the pulses of light and the amount of time between each of the pulses are substantially equal in length of time.

13. The method of claim 7, wherein the predetermined frequency is selected based at least in part on the distance range.

14. The method of claim 7, further comprising determining that the distance is within a predetermined subset of the distance range based at least in part on the measurement of the light detected during the third interval being substantially equal to the measurement of the ambient light.

15. The method of claim 7, further comprising segmenting the surface into a plurality of surface locations.

16. The method of claim 15, further comprising aggregating a plurality of distances from the plurality of surface locations to identify a surface profile within the distance range, the surface profile including the surface location having the calculated distance.

17. A system comprising:

a light emitter to emit light in pulses having a predetermined frequency;

at least one light sensor to detect the light that is emitted from the light emitter and reflected off a surface, the light sensor to detect the light that is emitted from the light emitter and reflected off of the surface during a period of time having at least n discrete time intervals of substantially equal length of time that occur during a cycle of the predetermined frequency, wherein n is an integer greater than or equal to three; and one or more processors to calculate a distance between the at least one light sensor and the surface, the distance being within a distance range defined by a distance traveled by the light during the cycle of the predetermined frequency, the one or more processors calculating the distance based at least in part on:

a ratio of a measurement of the light detected during a first group of the time intervals and a second group of the time intervals, and a determination of which one of the discrete time intervals has a lowest measurement of detected light.

18. The system of claim 17, wherein n is equal to four and each of the discrete intervals is equal to one-quarter of one cycle of the predetermined frequency.

19. The system of claim 18, wherein the ratio is defined by a measurement of the light detected during a first two time intervals and a measurement of the light detected during a last two time intervals.

20. The system of claim 17, wherein the determination of which one of the discrete time intervals has the lowest measurement of detected light indicates that the distance is within a predetermined subset range within the distance range.

21. The system of claim 17, further comprising determining a measurement of ambient light based at least in part on the lowest measurement of light detected in any of the n number of the discrete time intervals.

22. The system of claim 21, further comprising adjusting the ratio by subtracting the measurement of the ambient light from the measurement of light detected during each of the discrete time intervals.

23. The system of claim 17, wherein the at least one light sensor includes a plurality of storage elements where each storage element stores energy resulting from detection of light during a different one of the n discrete time intervals, the energy created by a photodiode shared by each of the plurality of storage elements.

24. The system of claim 23, wherein the one or more processors calculate the distance using the ratio of the energy stored in each storage element after a plurality of cycles.

25. The system of claim 24, wherein the at least one light sensor includes a comparator and limiter circuit that at least temporarily prevents further storage of energy by the plurality of storage elements when a fill level of energy of one of the plurality of storage elements reaches or exceeds a threshold level.

26. A method comprising:
   emitting, by at least one light emitter, light in pulses having a predetermined frequency;
   detecting, by at least one light sensor, the light after the light is reflected off a surface, the detecting being performed during at least n discrete time intervals of substantially equal length of time that occur during a cycle of the predetermined frequency, wherein n is an integer greater than or equal to three; and
   calculating, by at least one processor, a distance between the at least one light sensor and the surface, the distance being within a distance range defined by a distance traveled by the light during the cycle of the predetermined frequency, the one or more processors calculating the distance based at least in part on:
      a ratio of a measurement of the light detected during a first group of the time intervals and a second group of the time intervals, and
      a determination of which one of the discrete time intervals has a lowest measurement of detected light.

* * * * *